C. S. BRADLEY.
METHOD OF PRODUCING COMMERCIALLY PURE COPPER.
APPLICATION FILED OCT. 25, 1913. RENEWED DEC. 20, 1917.
1,275,374. Patented Aug. 13, 1918.
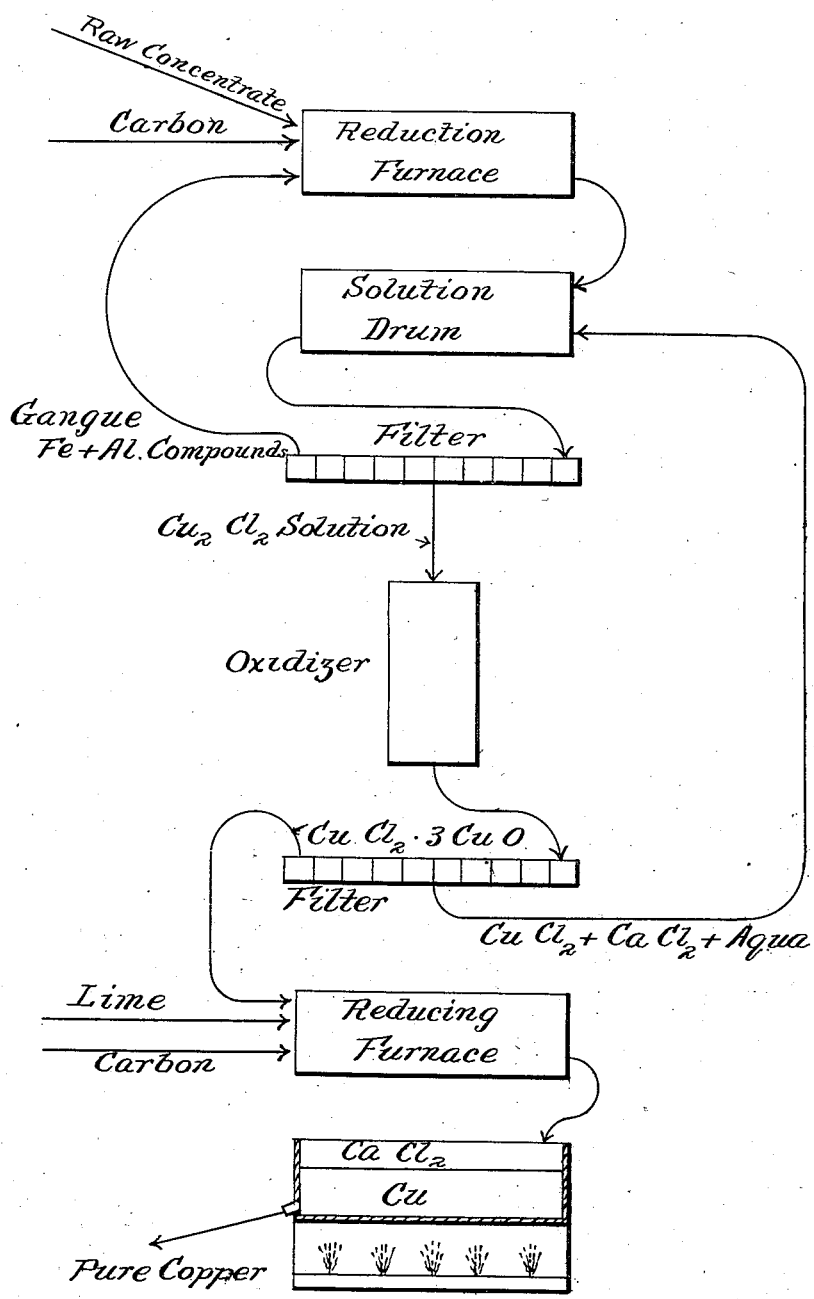

UNITED STATES PATENT OFFICE.

CHARLES S. BRADLEY, OF NEW YORK, N. Y.

METHOD OF PRODUCING COMMERCIALLY-PURE COPPER.

1,275,374.   Specification of Letters Patent.   Patented Aug. 13, 1918.

Application filed October 25, 1913, Serial No. 797,161. Renewed December 20, 1917. Serial No. 208,148.

*To all whom it may concern:*

Be it known that I, CHARLES S. BRADLEY, a citizen of the United States, residing in the city, county, and State of New York, have invented certain new and useful Improvements in Methods of Producing Commercially-Pure Copper, of which the following is a full and clear specification.

My invention relates to the production of metals such as copper, and is particularly applicable to the production of copper from concentrates, such as obtained in either wet chemical or mechanical concentration of ore values. This invention can be applied, however, to other substances.

The object of the invention is mainly to economically reduce the copper and obtain it in approximately pure metallic condition. The more common practice at the present time involves treatment in the smelter, and my present invention aims to obtain the copper in a higher degree of purity and at less cost than possible by smelter treatment.

While certain of the individual steps in my process may themselves be novel, I may describe the entire process as comprising in general the preliminary reduction, at low red heat, whereby only the copper content is rendered soluble for the subsequent treatment, the dissolving of the copper content, leaving the other substances as gangue, the separation of the solution containing the copper values from the gangue containing the iron, aluminum, etc., the oxidation of the solution to precipitate a copper compound free from iron, aluminum, etc., at the same time regenerating the dissolving solution, the reduction of the pure copper precipitate, and finally the production of fused commercially pure copper from the product of reduction. Another aspect of my invention comprises obtaining a concentrate in the form of trioxychlorid of copper, and the subsequent reduction of this compound to metallic copper.

In the steps above outlined, the reductions occur at low red heat which is below the reducing point of iron, aluminum, etc. and below the melting point of copper. The final step of producing the fused commercially pure copper is the only point in the process where the temperatures are above low red heat and it may be stated that the chemical actions of the process are all low temperature reactions, that is to say, far below the temperatures obtaining in the usual smelter treatment.

A specific example of the process is illustrated in the accompanying diagram.

To clearly set forth the principles of the invention I shall describe a specific embodiment thereof applied to the production of commercially pure copper from the product of wet chemical ore concentration. We may take, as an example of such concentrate, trioxychlorid of copper intermixed with iron and aluminum compounds, such as would be obtained, for example, in precipitating copper from chlorid solutions by calcium carbonate. The trioxychlorid of copper, containing all of the copper present in the concentrate, is first to be subjected to treatment for obtaining the copper content free from the iron and aluminum compounds. According to my present invention the first step would thus comprise treatment of the concentrate in a furnace at low red heat, with a suitable reducing agent which may be, for example, carbon. In place of carbon other reducing agents might be employed, either gaseous or in any other physical form and I may refer to such gases as hydrogen, water gas and carbon monoxid. The reduction taking place at low red heat will be accomplished below the fusing point of copper and below the reducing temperature of the iron and aluminum compounds. The material of the furnace may therefore be iron, copper or iron lined with copper. The chemical reaction which takes place is as follows:

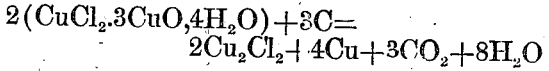
$$2(CuCl_2.3CuO,4H_2O)+3C=$$
$$2Cu_2Cl_2+4Cu+3CO_2+8H_2O$$

The entire mass containing the metallic copper, cuprous chlorid and iron and aluminum compounds is next introduced into a digesting and dissolving solution comprising cupric chlorid and calcium chlorid in water, whereby a cuprous chlorid solution is obtained as follows:

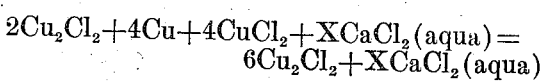
$$2Cu_2Cl_2+4Cu+4CuCl_2+XCaCl_2(aqua)=$$
$$6Cu_2Cl_2+XCaCl_2(aqua)$$

The iron and aluminum are not acted upon in the above treatment, whereas all the copper is converted into cuprous chlorid which is soluble in calcium chlorid solution.

The solution is then filtered from the gangue and thus freed of iron and aluminum compounds. This gangue may be returned and treated in the original ore concentration process if desired.

The clear solution now containing only the copper values is then ready for the recovery of the copper. The cuprous chlorid in calcium chlorid solution, is, for this purpose, oxidized, whereupon pure trioxychlorid of copper (free from iron and aluminum) and cupric chlorid are produced as follows:

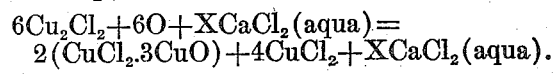

$$6Cu_2Cl_2 + 6O + XCaCl_2(aqua) = 2(CuCl_2.3CuO) + 4CuCl_2 + XCaCl_2(aqua).$$

The water of hydration is omitted from the formula of the trioxychlorid for the sake of clearness. The trioxychlorid is in the form of a precipitate, whereas the cupric chlorid and calcium chlorid are in solution. The solution of cupric chlorid and calcium chlorid in water is theoretically equal quantitatively to the dissolving solution employed in the digesting of cuprous chlorid and metallic copper above described and is to be returned to that operation. The trioxychlorid is to be subjected to the final reduction for recovery of the copper.

The precipitated trioxychlorid is therefore separated from the cupric chlorid and calcium chlorid solution, by filtration, whereupon the solution is returned to a preceding portion of the method where the digestion of cuprous chlorid and metallic copper takes place.

The pure trioxychlorid of copper is furnaced with lime and, for example, carbon, at low red heat to obtain the copper in metallic form. The chemical reaction may be represented as follows:

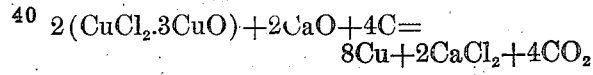

$$2(CuCl_2.3CuO) + 2CaO + 4C = 8Cu + 2CaCl_2 + 4CO_2$$

Here again the temperature is below the melting point of copper and copper, iron, nickel or the like, may be employed as the material of the furnace. The metallic copper obtained in this reaction has associated with it calcium chlorid, and a small amount of unreduced cuprous chlorid remains with the calcium chlorid. The product is in more or less finely divided form. The final treatment to which the product is next subjected frees the metallic copper of substantially the last trace of impurities, such as calcium chlorid and cuprous chlorid, and produces fused copper in substantially pure condition.

The finely divided product is for this purpose introduced into a fused calcium chlorid bath at a temperature above the melting point of copper. The particles of copper will thereupon fuse together and settle to the bottom. The cuprous chlorid as above stated seems to remain with the calcium chlorid. At any rate it is not volatile under the conditions of this step and does not appear in the fused copper, which is produced. The calcium chlorid is entirely separated from the copper, and hence the copper product is commercially pure and may be tapped off from below the level of the calcium chlorid flux. It is also interesting to observe that fused calcium chlorid dissolves about 20% of lime, so that the quantity of lime employed in the immediately preceding reduction treatment may be slightly in excess of the amount necessary to convert the chlorin of the trioxychlorid into calcium chlorid. This excess, arriving in the fused calcium chlorid bath will be taken up by the bath without disturbing the fluidity of the calcium chlorid flux.

The reductions set forth in the above method take place with great rapidity and the chemical actions are exothermic. The heat of chemical action may therefore be sufficient, if properly conserved and regenerated, to maintain the temperature of reactions.

I have referred to the use of lime and carbon as the final reducing agent. In the reaction which takes place, the carbon in the presence of the lime and trioxychlorid, at a low red heat, takes up the oxygen of the lime and cupric oxid radical while the calcium takes up the chlorin of the cupric chlorid radical of the trioxychlorid. The use of lime and carbon specifically is, of course, a feature of my present invention inasmuch as calcium chlorid may be the carrier solution employed in the extraction of the ore values in the original concentration system. The presence of the lime in the reducing action has the function of forming a compound with the chlorin which is not volatile at the reducing temperature and prevents the escape of copper by volatilization in the form of chlorid. It will, therefore, be apparent that while for some reasons lime is the preferred base employed, other bases might under suitable conditions be employed in place of lime. For example, other oxids of alkaline earth metals or oxids of alkali metals will perform the function of forming a nonvolatile chlorid at the temperature of the reduction. The production of the subsequent flux will also be accomplished by these other equivalents of the lime. In its broader sense, therefore, the invention is not limited to the use of lime and carbon, and substitutes for carbon might likewise be employed within the scope of my invention.

I have referred to the present method as being in some ways a parallel to the smelter methods at present in common use. The invention may also be regarded as parallel to the electrolytic or other refining methods, as the product obtained is substantially pure copper. It will, therefore, be understood that in referring to the production of copper I do not mean to be understood as having in mind only the producution of a crude product which is subsequently to be refined, but I mean to include the production of refined copper and, in f..ct, the invention may be employed as a refining process. The copper anode itself, which is now the starting point of the electrolytic refining methods can be advantageously refined under the principle of my present invention by producing from it a chlorid which is subsequently precipitated and reduced to substantially pure metallic form.

The volatility of cuprous chlorid has heretofore been regarded as a hindrance to commercial reduction of this compound, due to the escape of copper. In the employment of low temperature reduction, however, the necessary application of heat can readily take place through the walls of a containing vessel and, therefore, the vessel may be a closed one and thus the loss of copper through volatilized cuprous chlorid is prevented.

I claim:

1. The method of producing copper, which comprises reducing a chlorin compound of copper at low red heat by means of a base forming a chlorid which is fusible but non-volatile at the melting point of copper, and subsequently fusing the reduced copper in a fused bath of the chlorid.

2. The method of producing copper, which comprises reducing a chlorin compound of copper by means of a base and carbon below the melting temperature of copper, and subsequently fusing the reduced copper in a fused bath of the chlorid produced in the reduction.

3. The method of producing copper, which comprises reducing a chlorin compound of copper by means of a base and carbon below the melting temperature of copper, and introducing the finely divided reduced copper associated with chlorid of the said base into a fused bath of the chlorid whereby the copper is fused and freed from the chlorid of the base.

4. The method of producing copper, which comprises reducing a chlorin compound of copper by means of lime and carbon at a temperature below the melting point of copper, and subsequently introducing the reduced copper, associated with resulting calcium chlorid into a fused calcium chlorid bath, whereby the copper is fused and freed of calcium chlorid.

5. The method of producing copper, which comprises reducing trioxychlorid of copper at a temperature below the fusion point of copper, by means of a base forming a chlorid which is fusible, but non-volatile at the melting point of copper, and subsequently fusing the reduced copper in a fused bath of the resulting chlorid.

6. The method of producing copper, which comprises reducing trioxychlorid of copper below the melting temperature of copper by means of lime and carbon and subsequently introducing the reduced copper associated with resulting calcium chlorid into a fused bath of the said chlorid, whereby the copper is fused and freed of calcium chlorid.

7. The method of producing copper, which comprises oxidizing a cuprous chlorid solution to precipitate a chlorin compound of copper, removing the precipitate from the solution, and reducing the precipitate to metallic copper.

8. The method of producing copper, which comprises oxidizing a cuprous chlorid solution to precipitate a chlorin compound of copper, removing the precipitate from the solution, and reducing the precipitate to metallic copper, at a temperature below the melting point of copper.

9. The method of producing copper, which comprises oxidizing a cuprous chlorid solution to precipitate the copper content, removing the precipitate from the solution, and reducing the precipitate with lime and carbon.

10. The method of producing copper, which comprises oxidizing a cuprous chlorid solution to precipitate the copper content, removing the precipitate from the solution, and reducing the precipitate with lime and carbon at low red heat.

11. The method of producing copper, which comprises oxidizing a cuprous chlorid solution to precipitate the copper content, removing the precipitate from the solution, reducing the precipitate by lime and carbon, and introducing the reduction product into a fused calcium chlorid bath.

12. The method of producing copper, which comprises oxidizing a cuprous chlorid solution to precipitate the copper content, removing the precipitate from the solution, reducing the precipitate by lime and carbon, at low red heat, and introducing the reduction product into a fused calcium chlorid bath.

13. The method of producing copper, which comprises forming a solution of cuprous chlorid in calcium chlorid solution, oxidizing the cuprous chlorid solution to precipitate the copper content, removing the precipitate from the solution, and reducing the precipitate with lime and carbon.

14. The method of producing copper, which comprises forming a solution of cuprous chlorid in calcium chlorid solution, oxidizing the cuprous chlorid solution to precipitate the copper content, removing the precipitate from the solution, and reducing the precipitate with lime and carbon at low red heat.

15. The method of producing copper, which comprises forming a solution of cuprous chlorid in calcium chlorid solution, oxidizing the cuprous chlorid solution to precipitate the copper content, removing the precipitate from the solution, reducing the precipitate with lime and carbon and introducing the reduction product into a fused calcium chlorid bath.

16. The method of producing copper, which comprises forming a solution of cuprous chlorid in calcium chlorid solution, oxidizing the cuprous chlorid solution to precipitate the copper content, removing the precipitate from the solution, reducing the precipitate with lime and carbon at low red heat and introducing the reduction product into a fused calcium chlorid bath.

17. The method of producing copper, which comprises dissolving cuprous chlorid in calcium chlorid solution, oxidizing the cuprous chlorid to precipitate trioxychlorid of copper, removing the trioxychlorid from the solution, returning the regenerated solution to the dissolving of further quantities of cuprous chlorid and reducing the trioxychlorid with lime and carbon.

18. The method of producing copper, which comprises dissolving cuprous chlorid in calcium chlorid solution, oxidizing the cuprous chlorid to precipitate trioxychlorid of copper, removing the trioxychlorid from the solution, returning the regenerated solution to the dissolving of further quantities of cuprous chlorid and reducing the trioxychlorid with lime and carbon at low red heat.

19. The method of producing copper, which comprises introducing a mixture of cuprous chlorid, metallic copper and gangue material containing iron, into a solution of cupric chlorid and calcium chlorid, removing the resultant solution of cuprous chlorid in calcium chlorid solution from the gangue material containing the iron, oxidizing the cuprous chlorid to precipitate trioxychlorid of copper, removing the precipitate from the solution and reducing the precipitate thus freed of the gangue material containing iron.

20. The method of producing copper, which comprises introducing a mixture of cuprous chlorid, metallic copper and gangue material containing iron, into a solution of cupric chlorid and calcium chlorid, removing the resultant solution of cuprous chlorid in calcium chlorid solution from the gangue material containing the iron, oxidizing the cuprous chlorid to precipitate trioxychlorid of copper, removing the precipitate from the solution and reducing the precipitate thus freed of the gangue material containing iron with lime and carbon.

21. The method of producing copper, which comprises introducing a mixture of cuprous chlorid, metallic copper and gangue material containing iron, into a solution of cupric chlorid and calcium chlorid, removing the resultant solution of cuprous chlorid in calcium chlorid solution from the gangue material containing the iron, oxidizing the cuprous chlorid to precipitate trioxychlorid of copper, removing the precipitate from the solution and reducing the precipitate thus freed of the gangue material containing iron with lime and carbon, at low red heat.

22. The method of producing copper, which comprises introducing a mixture of cuprous chlorid, metallic copper and gangue material containing iron into a solution of cupric chlorid and calcium chlorid, removing the resultant solution in calcium chlorid solution from the gangue material containing the iron, oxidizing the cuprous chlorid to precipitate trioxychlorid of copper and regenerate cupric chlorid, removing the precipitate from the solution, returning the regenerated solution to the dissolving of further copper values, and reducing the precipitate thus freed of the gangue material containing iron.

23. The method of producing copper, which comprises introducing a mixture of cuprous chlorid, metallic copper and gangue material containing iron into a solution of cupric chlorid and calcium chlorid, removing the resultant solution of cuprous chlorid in calcium chlorid solution from the gangue material containing the iron, oxidizing the cuprous chlorid to precipitate trioxychlorid of copper and regenerate cupric chlorid, removing the precipitate from the solution, returning the regenerated solution to the dissolving of further copper values and reducing the precipitate thus freed of the gangue material containing iron with lime and carbon.

24. The method of producing copper, which comprises introducing a mixture of cuprous chlorid, metallic copper and gangue material containing iron into a solution of cupric chlorid and calcium chlorid, removing the resultant solution of cuprous chlorid in calcium chlorid solution from the gangue material containing the iron, oxidizing the cuprous chlorid to precipitate trioxychlorid of copper and regenerate cupric chlorid, removing the precipitate from the solution, returning the regenerated solution to the dissolving of further copper values and reducing the precipitate thus free of the gangue material containing iron with lime and carbon at low red heat.

CHARLES S. BRADLEY.

Witnesses:
OCTAVIUS KNIGHT,
M. G. CRAWFORD.